United States Patent [19]

Köhler

[11] 3,910,479
[45] Oct. 7, 1975

[54] DE-SOLDERING APPARATUS

[75] Inventor: Franz Köhler, Wertheim/Main, Germany

[73] Assignee: Ersa Ernst Sachs KG, Wertheim/Main, Germany

[22] Filed: Dec. 7, 1973

[21] Appl. No.: 424,234

[30] Foreign Application Priority Data
Dec. 16, 1972 Germany............................ 2261646

[52] U.S. Cl. .................................. 228/20; 219/230
[51] Int. Cl.² ........................................... B23K 3/04
[58] Field of Search ........... 228/20, 51, 52; 219/230

[56] References Cited
UNITED STATES PATENTS

| | | | |
|---|---|---|---|
| 2,955,187 | 10/1960 | Campo | 219/230 X |
| 3,690,539 | 9/1972 | Geiger | 228/20 |
| 3,842,240 | 10/1974 | Wakita et al. | 228/20 X |

FOREIGN PATENTS OR APPLICATIONS

| | | | |
|---|---|---|---|
| 1,251,446 | 10/1967 | Germany | 228/19 |

Primary Examiner—Al Lawrence Smith
Assistant Examiner—K. J. Ramsey
Attorney, Agent, or Firm—Michael S. Striker

[57] ABSTRACT

A housing has a chamber provided with an inlet and an outlet which is spaced from the inlet and which is connectible with a source of suction. A filter extends across the outlet and a tube of a material which does not bond with liquid solder extends coaxially from the inlet and has an open end remote from the same. The tube has an inner diameter which is smaller than the diameter of the inlet. A nozzle is connected with the tube and has a passage which coaxially communicates with the open end of the latter and which has a diameter smaller than the inner diameter of the tube. A heating arrangement serves to heat the tube in the region of the nozzle to a temperature of such a level that such non-solder components as flux and the like are reduced to ashes as they travel from the nozzle towards the chamber.

13 Claims, 1 Drawing Figure

U.S. Patent Oct. 7, 1975 3,910,479
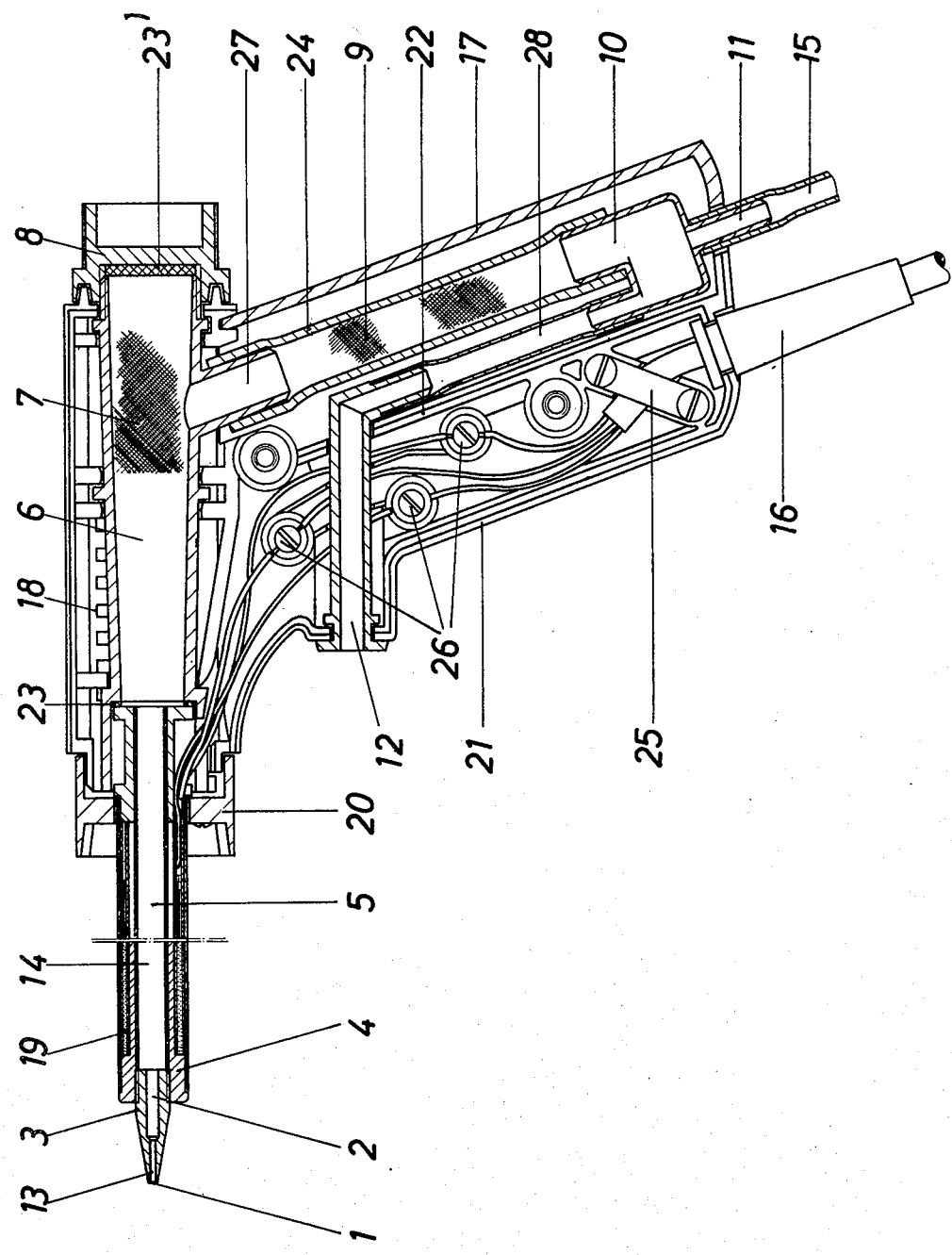

DE-SOLDERING APPARATUS

BACKGROUND OF THE INVENTION

The present invention relates generally to a de-solder apparatus, particularly to a novel de-soldering apparatus which makes it possible to rapidly dissolve existing solder connections.

De-soldering equipment is already known from the prior art. It serves the purpose of disconnecting electrical or electronic components which have been soldered in place. This is, for instance, necessary for repair work and the like, where components that may have been mounted on an electronic circuit board will have to be removed, and for similar applications.

It is desirable that such an apparatus be capable not only of heating the solder and permitting the removal of the component in question, but also of removing the solder itself, i.e., by suction. An apparatus of this type is known from U.S. Pat. No. 2,826,667, and also from German allowed application No. 2,147,443. Both of these apparatuses of the prior art are capable of carrying out their intended function. It has, however, been found that the solder and in particular flux residues and other residues which are usually sticky and in some instances very aggressive, tend to clog the channels through which the solder is to be aspirated by suction. The cleaning of these channels is extremely difficult and time consuming, and of course this is reflected in a considerable amount of downtime, and in a consequent loss of productivity.

An attempt has been made in the prior art to construct the chamber in which the solder is to be collected as a flow separator, and to connect the chamber via a suction tube with the heated suction nozzle, the tube having a diameter which is larger than that of the nozzle passage. However, experience has shown that this also has not been successful in preventing the deposition of solder and various residues in the region downstream of the heating zone of the apparatus, and before the solder can reach the collecting chamber.

SUMMARY OF THE INVENTION

Accordingly, it is an object of the present invention to provide a novel and improved de-soldering apparatus which avoids the existing disadvantages.

More particularly, it is an object of the present invention to provide such a de-soldering apparatus which not only avoids the aforementioned disadvantages, but which makes it possible to de-solder components from printed circuit boards, other circuit boards, and in fact any kind of solder connection without damage to any of the components, both those to be removed and those from which they are to be removed.

Another object of the invention is to provide such an apparatus which, although it must have an extremely small nozzle in order to be able to carry out the de-soldering of components under the circumstances outlined in the preceding paragraph, nevertheless is reliably protected against clogging of the suction passages by solder and/or flux and other residues.

In keeping with the above objects, and with others which will become apparent hereafter, one feature of the invention resides, in a de-soldering apparatus, in a combination which comprises chamber-forming means defining a chamber having an inlet and a spaced outlet which is adapted to communicate with a source of suction. A filter extends across the outlet. A tube of a material which does not bond with liquid solder extends coaxially from the inlet and has one open end remote from the same. The tube has an inner diameter which is smaller than the diameter of the inlet. A nozzle is connected with the tube and has a passage that communicates coaxially with the open end of the tube and which has a diameter smaller than that inner diameter of the tube itself. Heating means is provided for heating the tube in the region of the nozzle to a temperature requisite for effecting reduction to ashes of such non-solder components as flux, protective lacquers and the like, which travel from the nozzle towards the chamber.

The tube may be of an alloy steel or the like with which the liquid solder will not bond. The fact that in the flow direction the passage through which the solder and/or residue must pass increases stepwise, assures that the solder will tend to flow freely and will not tend to adhere to the walls bounding the passages. The particles which enter the chamber are prevented by the filter from being drawn into the suction connection and are largely separated in the filter itself. Since only the rearward portion of the chamber accommodates the filter, there is sufficient room left in the chamber for the accumulation of material so that the chamber need be emptied out only infrequently.

The nozzle itself is advantageously, although not necessarily, of substantially conical configuration and made of a material that is resistant to wear, for instance again suitable alloy steel. The passage in the nozzle may be enlarged inwardly of the inlet end of the nozzle, and the enlargement may be significant and may begin as soon as the conical configuration of the nozzle permits an enlargement of the passage. The nozzle is advantageously releasably connected with the tube or with the heating means which may be tubular itself and may, in part, surround the open end of the tube, with the nozzle, in part, being inserted into the heating means. With such a construction, the suction tube and the chamber are accessible from both ends once the nozzle is removed and once a cover closing and opening in the wall bounding the chamber has been withdrawn. This greatly facilitates cleaning.

The invention makes it possible to utilize a nozzle the outer diameter of which at the inlet end thereof is so small that even solder connections of the smallest components can be removed. A high suction at the very small cross section inlet of the nozzle permits a complete removal of the solder, and the de-soldering of components having a plurality of terminals.

It is advantageous if an aerosol-trapping filter is arranged downstream of the filter in the chamber, the term "downstream" referring to the direction of flow of air and solder through the apparatus. This further protects the source of suction against the possible entry of contaminants.

It is advantageous if the novel apparatus has a housing of pistol shape, which in the region of the chamber is formed with cooling slots and in the handle portion of which there are arranged the connections for the electrical supply needed to heat the heating means, and the connection for the external source of suction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a somewhat diagrammatic section through an apparatus according to the invention.

DESCRIPTION OF THE PREFERRED EMBODIMENTS

Referring now to the drawing in detail, it will be seen that reference numeral 3 identifies a conically configurated nozzle through which softened solder is to be aspirated. The nozzle 3 is of a material that is resistant to wear, for instance alloy steel, and has an inlet opening 1, and a passage extending inwardly from the inlet opening and composed of a passage portion 13 which is of small diameter and which is followed by a passage portion 2 of substantially larger diameter. The diameter of the passage portion 13 may for instance be on the order of 0.1–1.5 mm, and that of the passage portion 2 may be double these values.

Reference numeral 4 identifies a carrier for heating means 19, the carrier 4 being of a material having good thermal conductivity. The inner or rear end of the nozzle 3 is threaded into the carrier 4. The latter is surrounded by and carries the heating means 19, which may be in form of an electrical resistance heater, and a front portion of a suction tube 5 is inserted into the carrier 4. The tube 5 has an outer diameter corresponding approximately to the maximum outer diameter of the nozzle 3, and the tube 5 is of a material—for instance alloy steel—which does not enter into a soldering bond with liquid solder. The trailing end of the tube 5 communicates with an inlet opening of a collecting chamber 6. Just as the inner diameter of the tube 5 is substantially larger than that of the passage portion 2 of the nozzle 3, so is the inner diameter of the chamber 6 and of the inlet opening thereof even larger than the inner diameter of the tube 5. The trailing or rearward end of the chamber 6 is provided with an outlet nipple 27, and a coarse filter 7 extends across the outlet 27 to prevent the entry of matter into the same. The rearward end of the chamber 6 is further provided with an opening that is normally closed by a threaded cap 8, although it should be understood that the cap could be connected in other ways than by means of threads. Seals 23 and 23' are provided at the junction between the chamber 6 and the tube 5 on the one hand, and at the junction between the chamber 6 and the cover 8 on the other hand.

The novel apparatus has a housing which essentially is composed of two shells 21 which are connected together by the cap 8, a connecting member 20 and transversely extending screws (not shown) which connect one of the shells to the other. The housing is of pistol shape and the shells 21 are recessed so as to form at the rear side of the handle (the side which faces rightwardly in the drawing) an opening which can be closed by a readily removable cover 17. The interior of the handle is subdivided by a wall 22 which is in turn composed of two portions each of which is integral with one of the shells 21. The thus created two adjacent compartments accommodate various components. The left-hand compartment in the drawing is provided with a tension relief clamp 25 for the electrical connection 16, and with terminals 26 for connection with the conductors leading to the heating means 19. In the right-hand compartment, which is accessible simply by removing the cover portion 17, there is provided a tubular conduit 24 which is pushed onto the outlet nipple 27 and which connects the chamber 6 with a T-shaped suction distributor 10 having a nipple 11 extending out of the handle and onto which a hose 15 can be pushed which is to be connected with a non-illustrated source of suction. An aerosol-trapping filter 9 is lodged in the conduit 24 and can readily be removed after the cover portion 17 is removed and the conduit portion 24 is slipped off the nipple 27. The conduit portion 24 is flexible so that the slipping-off and slipping-on can be accomplished by temporarily flexing it. The filter 9 traps aerosols, i.e., very small and very light solder or residue components which manage to travel through the coarse filter 7. A conduit 28 is also connected with the distributor 10 and passes through the left-hand compartment to an opening 12 which can be closed by placing a finger across it. In the region of the chamber 6, the housing is formed with cooling slots 18.

It will be appreciated that as long as the opening 12 is not closed by placing a finger across it, or otherwise closing it, cool air is drawn from the ambient atmosphere into the hose 15. As soon as the nozzle 3, which, of course, is heated by the heating means 19, has melted the solder the operator will place his finger across the opening 12, so that now suction passes from the hose 15 through the chamber 6, the tube 5 and the nozzle 3, causing the liquid solder to be aspirated through the nozzle 3 and into the chamber 6, together with any flux residue, protective lacquer coating or the like. These residues, such as flux, protective lacquer and the like, are incinerated to or near ash condition as they pass the zone 14 which is heated to red heat by the heating means 19. In this condition, these components are no longer sticky and cannot clog any passages. Particles of solder which contact the inner surface of the tube 5, cannot form a solder bond with the tube because of the material of which the tube is constructed, and are therefore carried along into the chamber 6. In the chamber 6 they are retained by the coarse filter 7 and will thus accumulate in the chamber 6. Any aerosols such as ashes which have formed in the zone 14 and are not retained by the relatively coarse filter 7, pass through the same and into the conduit 24 where they are trapped in the finer filter 24.

When the apparatus has to be cleaned, inspected or repaired, the nozzle 3 is unscrewed, the opening in the chamber 6 is exposed by unthreading the cap 8 and removing the seal 23', and the filter 7 can now be removed and replaced, and at the same time the tube 5 and the chamber 6 can be cleaned. The filter 9 can also be readily removed by removing the cover portion 17, and, of course, instead of cleaning it is possible to carry out inspections or repairs in an equally simple manner.

It will be understood that each of the elements described above, or two or more together, may also find a useful application in other types of constructions differing from the type described above.

While the invention has been illustrated and described as embodied in a de-soldering apparatus, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

what is claimed as new and desired to be protected by Letters Patent is set forth in the appended claims.

I claim:

1. In a de-soldering apparatus, a combination comprising means for aspirating and collecting the solder and having a collecting chamber, inlet duct means communicating with said chamber and having an inlet for aspirating the solder, outlet duct means adapted to communicate with a source of suction and communicating with said chamber, and collecting means in said chamber; and means for preventing clogging of said aspirating means by the solder and contaminants thereof, including a solder-repelling surface bounding at least part of said inlet duct means, and heating means for heating a region of said inlet duct means to a temperature sufficient for reducing the contaminants to ashes, said inlet duct means having a cross section which stepwise increases from said inlet to said chamber whereby the advancement speed of the aspirated solder through said inlet duct means decreases from an aspiration speed at said inlet to a reduction speed in said region so that the dwell time of the solder in said region is sufficient for reducing the contaminants in the solder to ashes, and to a collection speed at said collecting means so that the solder and the ashes are collected thereby.

2. A combination as defined in claim 1, wherein said inlet duct means includes a nozzle formed with said inlet, and a tube communicating with said inlet and with said chamber and having a cross-section larger than said inlet.

3. A combination as defined in claim 2, wherein said heating means comprises a tubular heating unit surrounding said tube in said region and having a part projecting forwardly of said tube; and wherein said nozzle is partially and releasably accommodated in said part.

4. A combination as defined in claim 3, wherein said nozzle is substantially conical and of wear-resistant material, said inlet having an inlet end portion of a smaller first diameter and an outlet end portion which communicates with said tube and has a larger second diameter.

5. A combination as defined in claim 2, wherein said nozzle is substantially conical and has a free end at which said inlet is open, said free end having a diameter of between substantially 0.5 and 1.5 mm.

6. A combination as defined in claim 1, wherein said collecting means includes a filter.

7. A combination as defined in claim 6, wherein said filter is replaceable.

8. A combination as defined in claim 6, said chamber having in the region of said filter an opening; and futher comprising a removable cover manually closing said opening.

9. A combination as defined in claim 1; further comprising an aerosol-trapping filter located in said outlet duct means.

10. A combination as defined in claim 9, said housing including a handle portion formed with said outlet duct means, and the latter having an open region; and further comprising a cover connected with said handle portion and normally overlying said open region, said cover being removable to afford access to said aerosol-trapping filter.

11. A combination as defined in claim 1, further comprising a substantially pistol-shaped housing accommodating said means and provided with cooling slots in the region of said chamber.

12. A combination as defined in claim 11, said housing including a handle portion; and further comprising electrical supply terminals and a connection for connecting said outlet duct means with said source, in said handle portion.

13. A combination as defined in claim 1, wherein said tube is formed with said solder-repelling surface; and wherein said tube is of alloy steel.

* * * * *